UNITED STATES PATENT OFFICE.

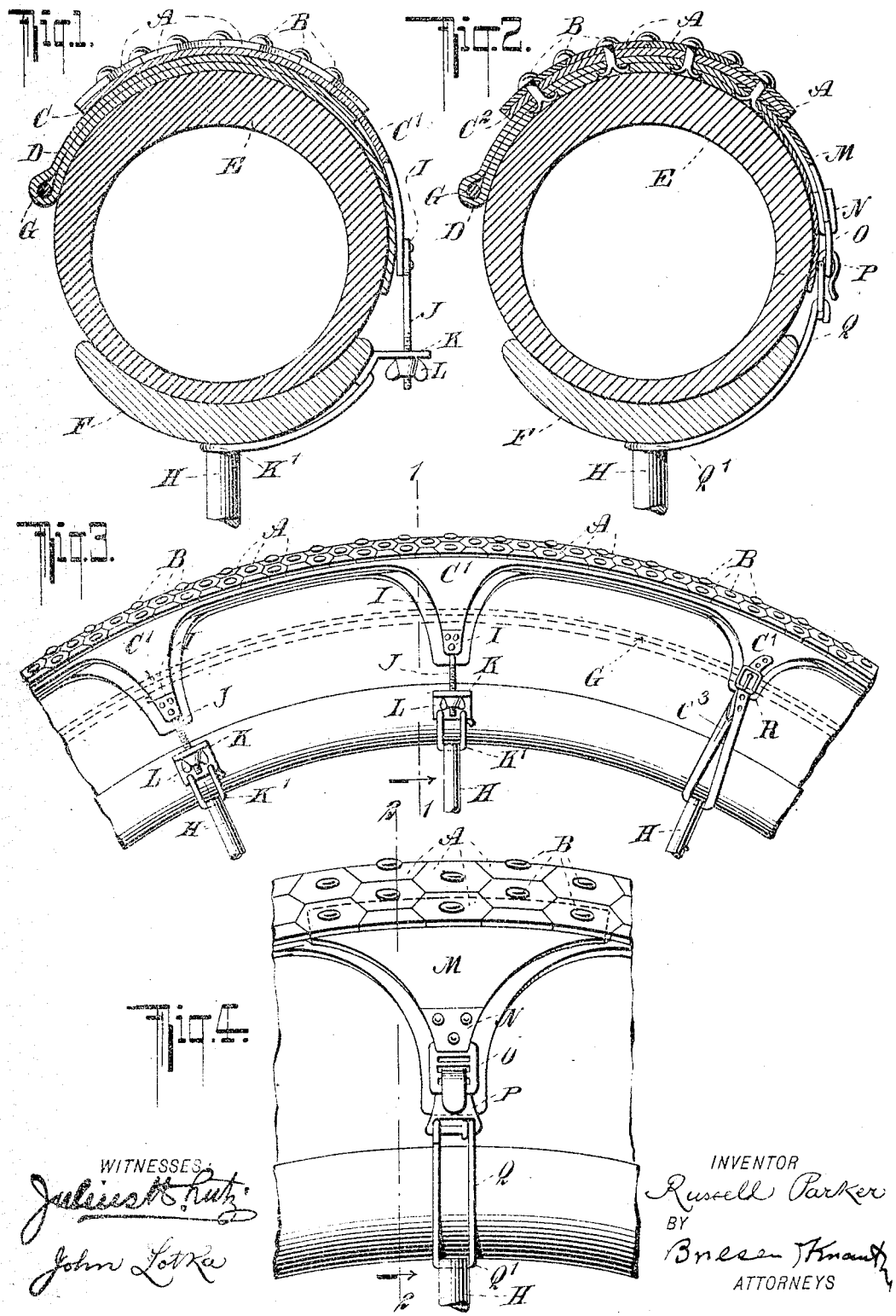

RUSSELL PARKER, OF NEW YORK, N. Y.

TIRE-PROTECTOR.

No. 870,796.

Specification of Letters Patent.

Patented Nov. 12, 1907.

Application filed November 22, 1905. Serial No. 288,545.

*To all whom it may concern:*

Be it known that I, RUSSELL PARKER, a citizen of the United States, resident of the borough of Brooklyn, county of Kings, city and State of New York, have invented new and useful Improvements in Tire-Protectors, of which the following is a specification.

My invention relates to protectors for vehicle tires, and has for its object to provide a device of this character which can be readily applied and removed and which will be firmly held on the tire when in use.

In the accompanying drawings I have illustrated two forms of my invention; Figure 1 is a cross section on line 1—1 of Fig. 3, which latter is a partial side elevation of a wheel and tire fitted with my improved protector; Fig. 2 is a cross section on line 2—2 of Fig. 4, the latter being a partial side elevation showing the second form of my invention.

The detail construction of the tread surface of the protector forms no part of the invention claimed herein.
I have shown a tread surface consisting of matched hexagonal or other plates A secured individually, as by rivets B to the flexible portion of the protector. In the form of construction illustrated by Figs. 1 and 3, this flexible portion comprises a layer of leather C, and a double layer of tire fabric D of the kind used in pneumatic tires, that is, rubber strengthened by cloth. The rivets B extend through all these layers in the me manner, as shown in Fig. 2. The tire fabric D is folded, as shown, to form a sheath or pocket for the reception of suitable strengthening device, such as a wire G, extending continuously around the protector. The purpose of this wire is to prevent a stretching of the protector at this point or in other words, to limit the diameter of its edge when in use, and thus hold the protector firmly against the tire E, which is engaged by the inner layer of the tire fabric D. The edge of the protector which contains the wire is free, that is, there is no connection from it to the adjacent portion of the rim F. At its other edge the protector is preferably loose or extensible (that is, it has no limiting device corresponding to the wire G) and is provided with suitable means for attaching it to the wheel, so as to hold the protector against separation from the tire E, and also against creeping. For this purpose the layer C is shown provided with tabs C' corresponding to the location of the spokes H, extending to the rim F. To the tabs C' are secured, as by riveted plates I, rods J, screw-threaded at their free ends and adapted to pass through holders K, which are engaged with the spokes, as indicated at K'. Preferably the wire or loop portion of each holder is formed with a hook at one end to facilitate applying the holders to the spokes, and removing them therefrom. Wing nuts L are used to tighten the connection of the holders K with the rods J. Preferably the wire G is located on the outside of the tire, and the holders K on the inside thereof, so that the holders will be practically concealed from view.

The protector may be applied while the tire is fully inflated, or only slightly deflated, the rods J and tabs C' being slipped over the tire from the outside thereof, until the wire G stops the inward movement of the tire. The holders K and rods J are then engaged with each other and the connection is tightened by means of the nuts L. The protector is thus firmly held on the tire, and is also prevented from creeping lengthwise of the tire, since the holders K are secured to the spokes, or virtually to the rim. I have adopted the engagement of the holder K with the spokes H as the simplest manner of attaching them to the wheel at the rim, but I do not wish to restrict myself to this particular construction.

In Figs. 2 and 4 I have shown a different way of connecting the protector with the wheel or spokes. In this case the leather layer C² is not provided with any tabs on the side opposite the wire G, but separate tabs M made of leather or other suitable material, are provided, these tabs being inserted at their upper ends between the leather layer C² and the tire fabric D, and being secured thereto by means of some of the rivets B. At their lower ends the tabs are provided with plates N, connected with a slotted member O, which is adapted to be engaged in any one of these slots by a buckle P of any well known or suitable construction. This buckle which is thus detachably and adjustably connected with the member O, forms part of a holder which also comprises a wire member Q, adapted to be bent around a spoke H, as shown at Q. Preferably the wire member Q is provided with a hook at one end so as to be readily connected and disconnected.

At the right hand portion of Fig. 3, I have indicated another construction for connecting the tire protector with the wheel on the inside. One of the tabs C' has been extended to form a strap C³ adapted to be placed around one of the spokes H, the end of the strap being secured in any suitable manner, for instance, by means of the customary buckle R. The tabs with which the holders are connected, may be integral with the leather layer C, as in Figs. 1 and 3, or with the tire fabric D, or they may be separate pieces, as in Figs. 2 and 4.

In both forms of construction shown, the tire fabric D is extended on the inner side of the tire to prevent the rod J or other connecting parts from rubbing against the tire, or indenting or chafing it.

I claim as my invention:

1. A tire protector having a free edge with a limiting device to restrict its diameter, the other edge being unrestrained to allow the protector to be slipped over the tire and to be drawn tight at individual points, and a number of holders extending from the other edge of the protector and adapted for connection with the wheel.

2. A tire protector having a free edge with a limiting device to keep it from expanding, the other edge being unrestrained, and a number of adjustable contractile holders connected with said loose edge.

3. A tire protector having a free edge with a limiting device to keep it from expanding, and a number of adjustable contractile holders extending from the other edge of the protector.

4. The combination with the rim and the tire, of a protector strip on the tread portion of the tire, one edge of said strip being spaced and disconnected entirely from the adjacent portion of the rim, a limiting device at said edge, and holders extending to the wheel from the other edge of the protector.

5. The combination with the rim and the tire, of a protector strip on the tread portion of the tire, a limiting device at one edge of said strip, which edge is spaced and disconnected from the adjacent portion of the rim, and a series of holders or fasteners extending to the wheel on the other side of the tire.

In testimony whereof, I have hereunto set my hand in the presence of two subscribing witnesses.

RUSSELL PARKER.

Witnesses:
CHARLES R. LA RUE,
JOHN LOTKA.